United States Patent
Momose et al.

(10) Patent No.: US 8,229,600 B2
(45) Date of Patent: Jul. 24, 2012

(54) FLOW CONTROLLING DEVICE

(75) Inventors: Osamu Momose, Tokyo (JP); Toshiya Arai, Tokyo (JP)

(73) Assignee: Azbil Corporation, Tokyo (JP)

( * ) Notice: Subject to any disclaimer, the term of this patent is extended or adjusted under 35 U.S.C. 154(b) by 758 days.

(21) Appl. No.: 12/408,752

(22) Filed: Mar. 23, 2009

(65) Prior Publication Data
US 2009/0248211 A1 Oct. 1, 2009

(30) Foreign Application Priority Data
Mar. 21, 2008 (JP) ................................. 2008-074704

(51) Int. Cl.
  G05D 7/00 (2006.01)
  G06F 19/00 (2011.01)
  G01F 1/00 (2006.01)
  H02M 3/335 (2006.01)
(52) U.S. Cl. ............... 700/282; 702/45; 363/17; 363/25
(58) Field of Classification Search .................. 700/282; 363/17, 25; 702/45
  See application file for complete search history.

(56) References Cited

U.S. PATENT DOCUMENTS

| | | | | |
|---|---|---|---|---|
| 6,810,308 B2 * | 10/2004 | Shajii et al. | .................... | 700/282 |
| 6,862,165 B2 * | 3/2005 | Chian et al. | .................... | 361/160 |
| 7,133,785 B2 * | 11/2006 | Larson et al. | .................... | 702/45 |
| 7,760,522 B2 * | 7/2010 | Nobiki et al. | .................... | 363/25 |
| 7,821,797 B2 * | 10/2010 | Nishiyama et al. | ............. | 363/17 |
| 2002/0196666 A1 * | 12/2002 | Huber | ....................... | 365/185.23 |

FOREIGN PATENT DOCUMENTS
JP 2000-205917 A * 7/2000
* cited by examiner

*Primary Examiner* — Kakali Chaki
*Assistant Examiner* — Sivalingam Sivanesan
(74) *Attorney, Agent, or Firm* — McDermott Will & Emery LLP

(57) ABSTRACT

To provide a flow controlling device capable of providing an accurate flow set by a setting device without mutual interference between flow controlling devices. A flow controlling device having a solenoid valve for adjusting the opening of a flow path and a valve driving circuit for driving the valve, having an analog inputting circuit for converting an inputted analog voltage value or analog electric current value into a specific digital value or analog value and then transmitting; a controlling portion processing the digital value or analog value transmitted from the inputting circuit and outputting an instruction signal depending on the flow that has been set; a signal transmitting portion that electrically isolates the controlling portion and the valve driving circuit and sends, to the valve driving circuit, the instruction signal from the controlling portion; an isolating power supply circuit for electrically isolating the analog inputting circuit and the controlling portion and for supplying a power supply to the analog inputting circuit and the controlling portion; and a non-isolating power supply circuit for providing a power supply to the valve driving circuit.

5 Claims, 4 Drawing Sheets

FLOW CONTROLLING DEVICE

CROSS REFERENCE TO PRIOR APPLICATIONS

The present application claims priority under U.S.C. §119 to Japanese Patent Application No. 2008-074704, filed Mar. 21, 2008. The content of that application is incorporated herein by reference in its entirety.

FIELD OF TECHNOLOGY

The present invention relates to a small, low-cost flow controlling device that can control the rate of a flow by adjusting accurately the opening of a valve without interference that is produced through being affected by the valve driving circuitry.

BACKGROUND OF INVENTION

A conventional flow controlling device has been developed that enables a simple interface from the outside to a setting device (a digital instrument, or the like) that sets the flow rate. As an example, there is a known flow controlling device for controlling and adjusting a valve in order to measure the flow of a fluid that is flowing in a flow path, and to control an adjusting valve through controlling means so that the flow of the fluid, which flows through the flow path, will match the flow that has been set. (See, for example, Japanese Unexamined Patent Application Publication 2000-205917 (Page 3 through Page 6, with Page 6 in Particular, and FIG. 1) ("JP '917")).

Additionally, methods for setting the flow for the flow setting device include a method for accessing using analog signals and a method wherein a setting value is inputted using input keys that are provided on a setting device that is connected to the flow controlling device. There is also a method for sending the setting value from a personal computer that is connected so as to enable communications between the flow controlling device and the personal computer through an RS-485 cable, or the like. A conventional flow controlling device will be explained below for the case of the analog signals, one of the setting methods.

FIG. 2 is a structural diagram illustrating a first electric current route for a valve driving electric current of a flow controlling device used conventionally for controlling flow rates using analog signals. In FIG. 2, code 1 is a setting device for outputting, through multiple channels, analog signals (flow setting signals), in accordance with the flow rate that has been set. The operator is able to set the flow rate at will for each channel. Code 2 is a flow controlling device A, and 3 is a flow controlling device B. These flow controlling devices 2 and 3 are connected, in a plurality thereof and in a mutually non-isolated state, to each channel of the setting device 1. Each channel (CH1, CH2) of the setting device has a respective positive terminal (+) and negative terminal (−), and are connected together to enable conductance so that the negative terminals of each are at the same potential (that is, they are in a non-isolated state). While the flow controlling devices 2 and 3 will be explained below, because codes 2 and 3 have identical structures, the details will be explained for the flow controlling device A of code 2.

The flow controlling device A comprises a solenoid valve 10 for adjusting the opening of a flow path through which a gas, or the like, passes in this device, a valve driving circuit 11 for driving the solenoid valve 10, a microcomputer 12, as a controlling device for outputting an instruction signal to the valve driving circuit 11, and an analog inputting circuit 13 for receiving an analog signal from the setting device 1 and sending it to the microcomputer 12. It further comprises a first power supply circuit 14 and a second power supply circuit 15 which are supplied direct current electric power from the external power supply 4. Note that the microcomputer 12 is, for example, a single-chip microcomputer, comprising a CPU, a ROM, and a RAM (not shown) internally. Note that while, of course, the following structures (1) through (5) that are disclosed as the flow measuring device in JP '917, below, are provided in the flow rate measuring device A, for convenience in understanding the drawings, they are omitted from the drawings: (1) a flow path wherein a fluid flows; (2) a detecting element for detecting the flow of the fluid that is flowing in the flow path; (3) a signal processing circuit for processing a detection signal that is outputted from the detecting element; (4) a converting device for converting, into a digital signal, an analog signal that is outputted from the signal processing circuit; and (5) a calculating device for outputting the flow rate of the fluid that is flowing in the flow path, based on the digital signal outputted from the converting device. Additionally, the functions of these structures (1) through (5) are disclosed in JP '917 and are thus omitted in the descriptions.

Additionally, when a plurality of flow controlling devices for gases for, for example, burner combustion are used, the individual flow controlling devices 2 and 3 are connected to the analog output channels (CH1, CH2, . . . ) of the setting device 1, and a method is used wherein flow setting signals are sent to the respective flow controlling devices 2 and 3 from the setting device 1.

However, for reasons having to do with cost, many of the users of the setting device 1 use a type wherein there is no isolation between the individual output channels. In the conventional flow controlling device wherein the flow is set by an analog signal, or in JP '917 that uses this type of setting device 1, when connecting to the shared external power supply 4, the driving electric current from the valve driving circuit that drives the solenoid valve flows not only through the electric current route I1 illustrated by the dotted line in FIG. 2, above, but also flows through the electric current route I2, indicated by the double dotted line (where only one of polarity side of the power supply line is illustrated).

That is, when one focuses on the flow controlling device 2, when, in the setting device 1 the voltage is set to between 0 and 5 V, then, normally, an electric current of the order of only several dozen microamps flows into the analog inputting circuit 13 of the flow controlling device 2. However, the electric current that drives the solenoid valve is, at most, in the order of several hundred milliamps (mA). This valve driving electric current also flows through the setting device 1 and the flow controlling device 3 into the electric current route I2, illustrated by the double dotted line. When this happens, there is an effect on the signal of the analog inputting circuit 13, producing error also in the setting value that is inputted into the microcomputer 12. Furthermore, because the flow controlling device 2 normally operates so as to cause the flow to match the flow setting value, if there is a change in the setting value for the flow, or a change in the pressure of the gas that is supplied, then there will be a large change in the electric current for driving the valve, which means that the effect on the analog inputting circuit 13 will also vary.

Furthermore, FIG. 3 is a structural diagram showing the same structure as in FIG. 2, illustrating a second electric current route, and shows both the electric current route I1 and the electric current route I2 from when the flow controlling device 3 was considered. The valve driving electric current for the flow controlling device 3 flows also in the analog inputting circuit of this device 3, and this valve-driving electric current also flows into the analog inputting circuit 13 of the flow controlling device 2. The result is that the change in the valve driving electric current of the flow controlling device 3 produces a variation in the flow setting value for the flow controlling device 2. Furthermore, because changes in the valve driving electric current of the flow controlling device 2 has an effect also on the flow controlling device 3, so the flow controlling device 2 and the flow controlling device 3 interfere with each other, and the greater the number of connected flow controlling devices, the more the complex mutual interactions, which has a deleterious effect on the stability of the flow setting values, producing a problem with a deleterious effect on the stability of the controlled flow.

In order to solve this type of problem, one might consider just isolating the power supply circuits that provide the power supply to the analog inputting circuit or the valve driving circuit. While one might consider placing an isolator before the signal from the setting device is inputted into the analog inputting circuit in order to isolate the analog inputting circuit, this approach has the drawbacks that there will be error in the setting if the signal is not converted accurately, and that the cost is high. In contrast, in the method of isolating the power supply circuit, one may consider adding an isolating DC-DC converter to the power supply circuit. In this case, there is no problem even if there is a conversion error of several percent on the power supply side, and the approach of isolating the power supply circuit side is also better in terms of costs.

FIG. 4 is a structural diagram of the case wherein an isolating DC-DC converter is connected as, specifically, a third power supply circuit 16 to the power supply circuits of the flow controlling devices 2 and 3 in FIG. 2 and FIG. 3, above, where although this is technology relevant to the present invention, it is not yet known publicly. Note that the individual structures were explained in FIG. 2 and FIG. 3 above, so will be omitted in the explanation for FIG. 4. The solenoid valves 10 of the flow controlling devices 2 and 3 have different orifice diameters depending on the range of the flows controlled, and so will have different requirements for the driving forces, or in other words, will have different required maximum drive electric currents.

Here, in FIG. 4 wherein the third power supply circuit 16 (the isolating DC-DC converter) is connected to the flow controlling devices 2 and 3, the flow controlling devices 2 and 3 are in identical states, so here the explanation will focus on only the electric current route I2 in the valve driving circuit 11 of the valve controlling device 2. Here the electric current in the valve driving circuit 11 is first blocked at the C1 position, as with the electric current route I1, so that there is no flow directly into the external power supply 4. Additionally, the electric current route I2 attempts to flow through the analog inputting circuit 13 of the flow controlling device 2 and the setting device 1 into the analog inputting circuit 13 of the flow controlling device 3 as well, but because this electric current is blocked at the C2 position by the third power supply circuit 16 (the isolating DC-DC converter) of the flow controlling device 3, the interference between the flow controlling device 2 and the flow controlling device 3 due to this electric current, as explained using FIG. 2 and FIG. 3, is completely eliminated.

However, the flow controlling devices 2 and 3 require the use of a DC-DC converter with a capacity compatible with the maximum drive electric current of the solenoid valve 10, which will vary depending on the maximum flow of, for example, the gas flowing therethrough. In particular, if the flow controlling devices 2 and 3 are used for large flows, then a large driving electric current will be necessary because the orifice diameters will be large, requiring the use of a high-capacity DC-DC converter, which is costly and physically large. Because of this, there are a number of drawbacks, such as not being able to generalize the third power supply circuit 16 (DC-DC converter), and not being able to generalize the circuit board for mounting the third power supply circuit 16, the analog inputting circuit, the valve driving circuit, and the like.

The object of the present invention is to provide a flow controlling device capable of eliminating the interferences between flow controlling devices, even when connecting a plurality of flow controlling devices to a single setting device.

SUMMARY OF THE INVENTION

A flow controlling device of the present invention is a flow controlling device having a flow path wherein a fluid flows, a solenoid valve for adjusting the degree of opening of the flow path, a valve driving circuit for driving the solenoid valve, a flow rate measuring device for measuring a flow rate of the fluid that flows in the flow path, and a controlling device for applying instruction signals to the valve driving circuit so as to cause the flow rate to match a setting value, and which operates having received a power supply supplied from the outside including:

an analog inputting circuit for converting an inputted analog voltage value or analog electric current value, as a setting value, into a specific digital value or analog value, and transmitting;

a controlling device for outputting an instruction signal based on the measured flow rate and the digital signal or analog signal transmitted from the analog inputting circuit;

a signal transmitting device for isolating electrically the controlling device and the valve driving circuit and for transmitting the instruction signal from the controlling device to the valve driving circuit;

an isolating power supply circuit for isolating electrically the analog inputting circuit and the controlling device from the valve driving circuit and for supplying power to the analog inputting circuit and the controlling device; and a non-isolating power supply circuit for supplying power to the valve driving circuit.

This electrically isolates the valve driving circuit, the analog inputting circuit, and the controlling device.

The flow controlling device of the present invention is a flow controlling device having a setting device for setting and outputting a flow rate, an external power supply for supplying a specific direct current voltage, a flow path wherein a fluid flows, a solenoid valve for adjusting the opening of the flow path, a valve driving circuit for driving the solenoid valve, a flow rate measuring device for measuring a flow rate of the fluid that flows in the flow path, and a controlling device for applying instruction signals to the valve driving circuit so as to cause the flow rate to match a setting value, including:

an analog inputting circuit for converting an analog voltage value or an analog electric current value, inputted as the setting value from the setting device, into a specific digital value or analog value, and transmitting;

a controlling device for outputting an instruction signal based on the measured flow rate and the digital signal or analog signal transmitted from the analog inputting circuit;

a signal transmitting device for isolating electrically the controlling device and the valve driving circuit and for transmitting the instruction signal from the controlling device to the valve driving circuit;

an isolating power supply circuit for isolating electrically, the analog inputting circuit, and the controlling device, from the external power supply, and for converting into a specific voltage a voltage supplied from the external power supply, and for supplying electric power to the analog inputting circuit and the controlling device; and a non-insulating power supply circuit, connected directly to the external power supply, for converting to a specific voltage the voltage supplied from the external power supply and for supplying power to the valve driving circuit.

This causes the value that is set by the setting device to be outputted accurately from the analog inputting circuit after eliminating the self-interference of the flow controlling device.

The flow controlling device as set forth below is the flow controlling device as set forth above, including:

a third power supply circuit for supplying the minimum required voltage to a first power supply circuit for supplying an electric power to the analog inputting circuit, and to a second power supply circuit for supplying an electric power to the controlling device, and also for blocking the electric current that is generated by the first power supply circuit and the second power supply circuit; and a fourth power supply circuit, connected directly to an external power supply, for supplying a stabilized voltage to the valve driving circuit.

The flow controlling device of the present invention is the flow controlling device as set forth above, wherein:

the isolating power supply circuit has at least one linear regulator, and is structured from an isolating DC-DC converter with an unstable output for supplying, to the linear regulator, an electric voltage that is at least the minimum required voltage and at most the maximum tolerable voltage, wherein:

each linear regulator outputs its own predetermined constant voltage.

This eliminates the self-interference of the flow controlling device, enabling the provision of a voltage to the valve driving circuit with even greater stability.

The flow controlling device of the present invention is the flow controlling device as set forth above, wherein the setting device has a plurality of output channels, at least two flow controlling devices are connected to the plurality of output channels, and the flow controlling devices are isolated from each other by a signal transmitting device and an isolating power supply circuit.

This eliminates the mutual interference between the plurality of flow controlling devices, causing the values set by the setting device to be outputted accurately from the analog inputting circuit, eliminating the errors in the flows in the flow paths because of the adjustments of the respective solenoid valves.

The present invention enables the provision of a small, low-cost flow controlling device wherein the self-interference and mutual interference between flow controlling devices is eliminated even when one flow controlling device or a plurality of flow controlling devices is connected to a single setting device.

DETAILED DESCRIPTION OF THE INVENTION

Figure 1:
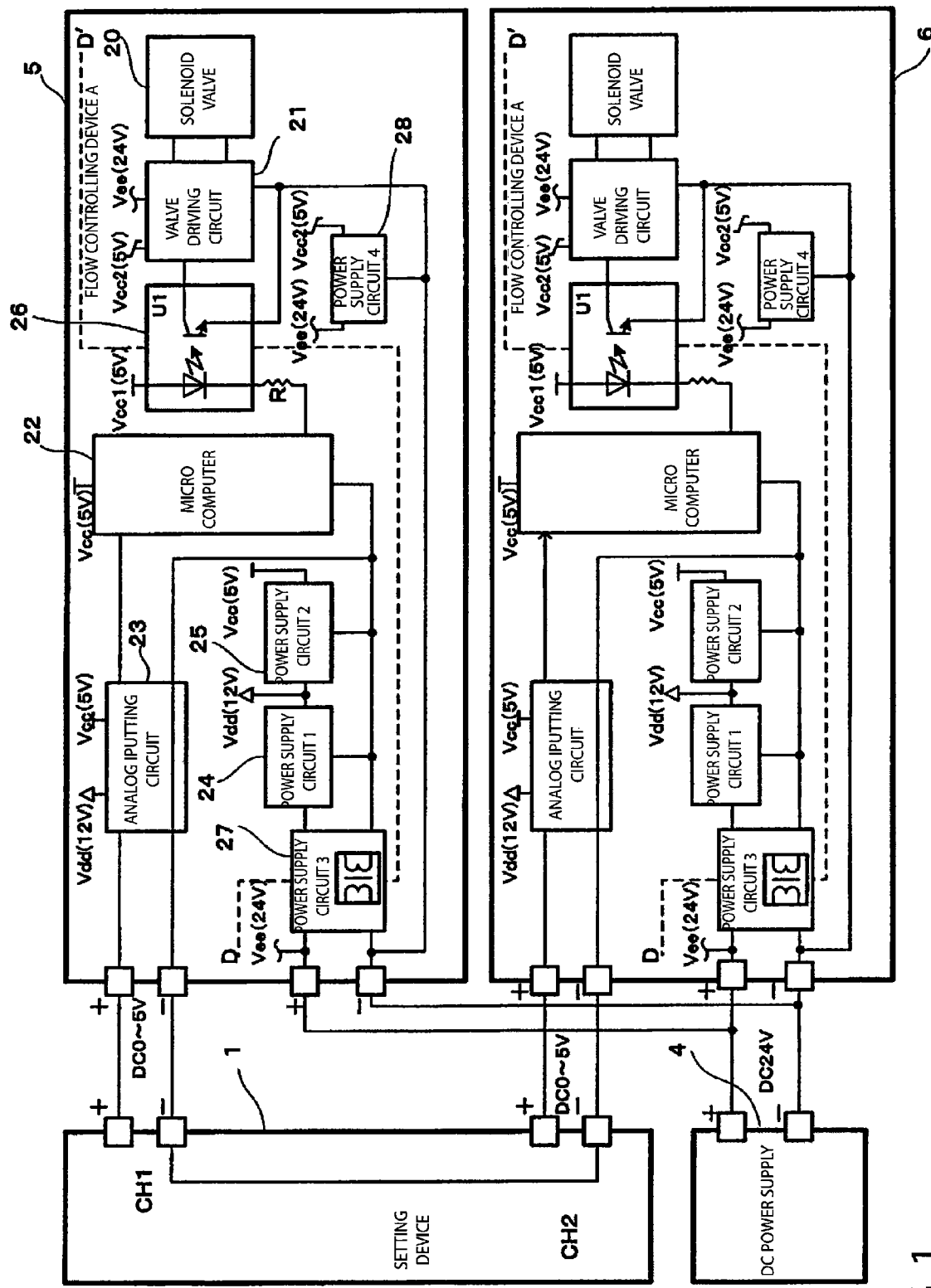
FIG. 1 is a structural diagram illustrating schematically a flow controlling device according to the present invention.
Figure 2:
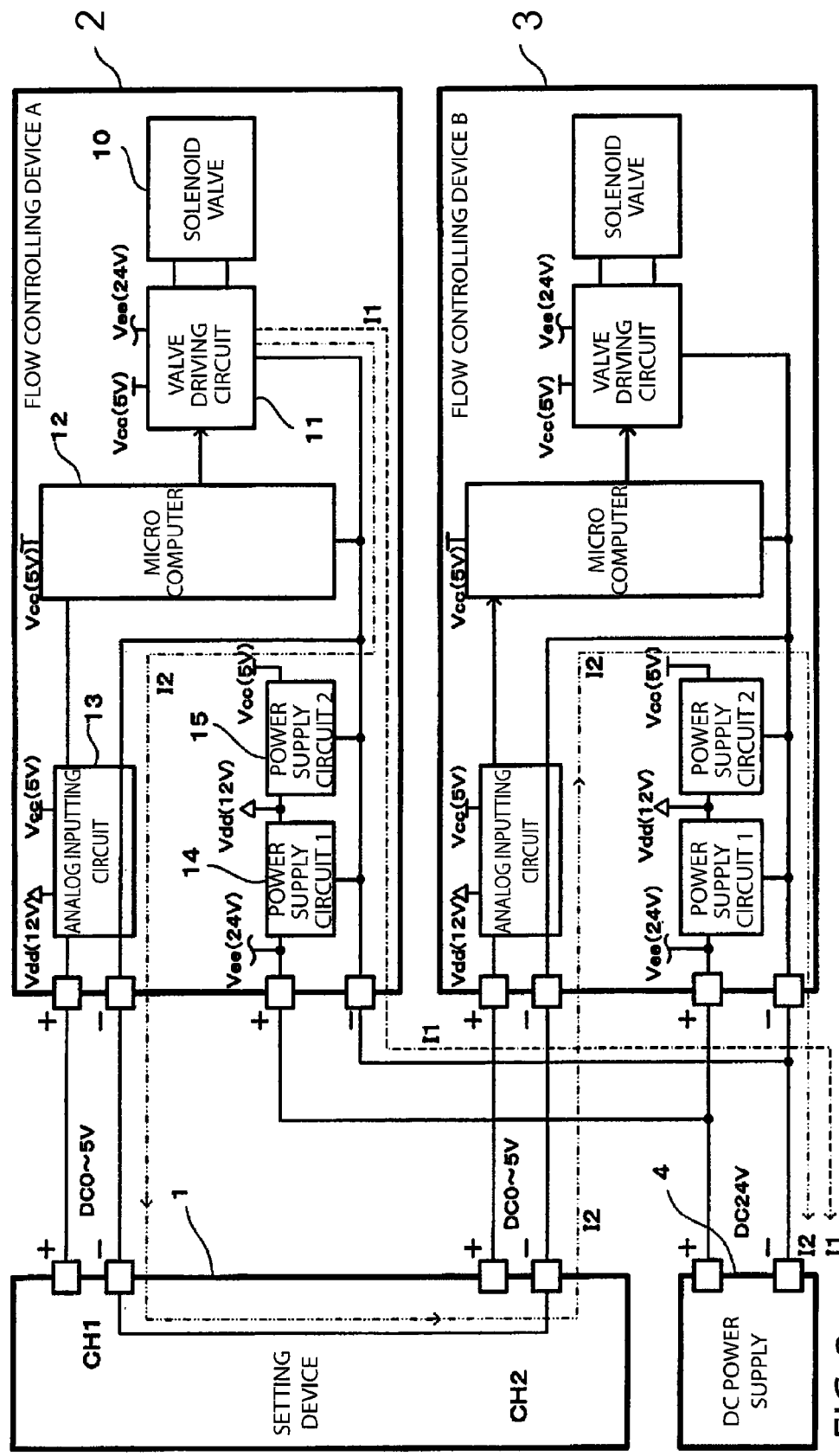
FIG. 2 is a structural diagram illustrating schematically a conventional flow controlling device and a first electric current route.
Figure 3:
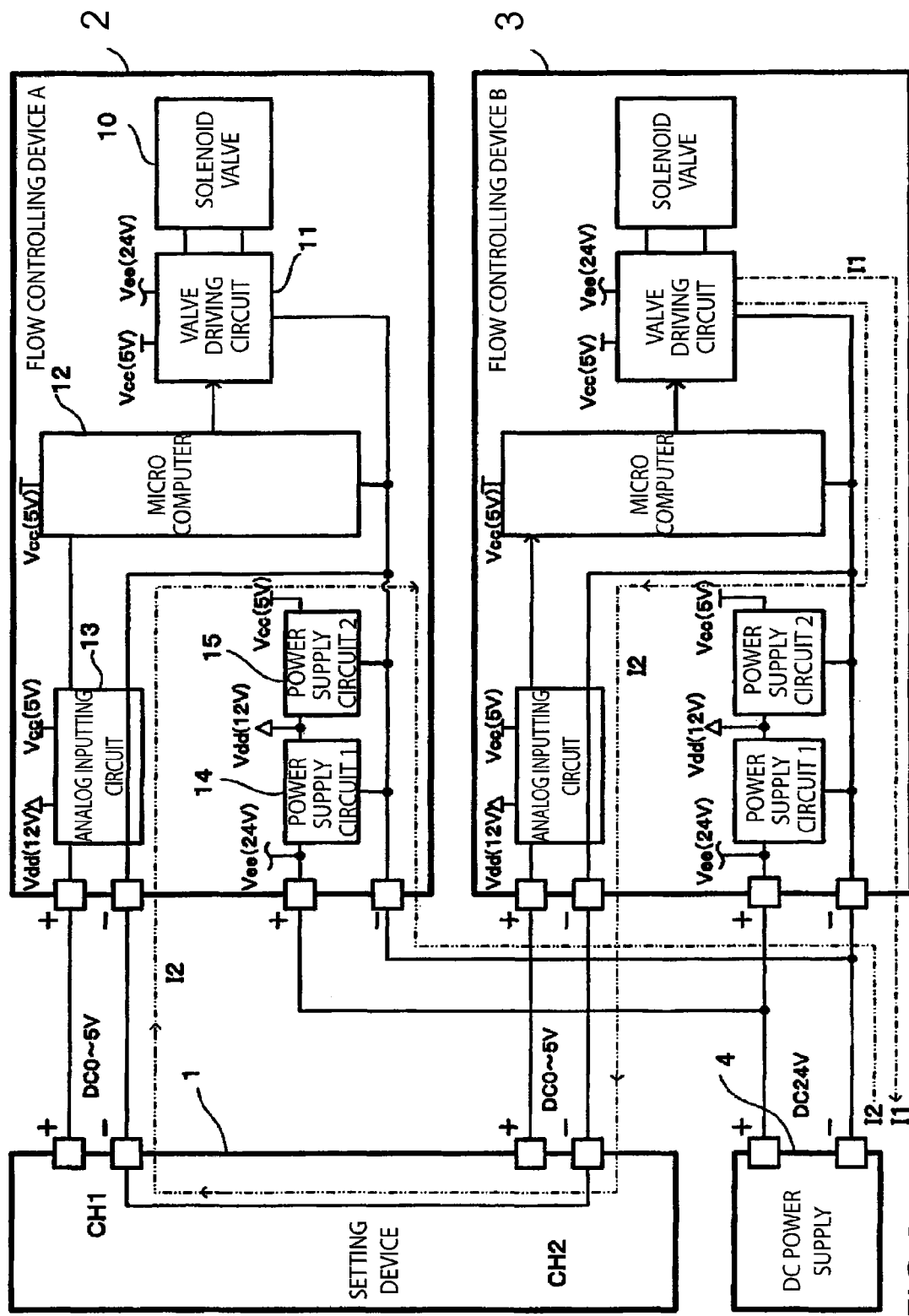
FIG. 3 is a structural diagram illustrating schematically a conventional flow controlling device and a second electric current route.

The flow controlling device according to the present invention will be explained in detail based on the drawings. In the Prior Art, only the power supply circuits were isolated from the other circuits. The flow controlling device according to the present invention has a structure wherein the power supply circuit and the valve driving circuit are isolated from the other circuits. FIG. 1 is a structural diagram of a flow controlling device according to the present invention, where the flow controlling devices 5 and 6 according to the present invention are connected to the setting device 1 explained in the "Background" section, above.

The flow controlling devices 5 and 6 each comprise a proportional solenoid valve 20, a valve driving circuit 21, a microcomputer (controlling device) 22, an analog inputting circuit 23, a first power supply circuit 24, and a second power supply circuit 25. Additionally, the flow controlling devices 5 and 6 each comprise a photocoupler 26 as a signal transmitting device, a DC-DC converter that is the third power supply circuit 27, and fourth power supply circuit 28. In the below, devices or all of the first through third power supply circuits may also be referred to in general as the "insulated power supply circuit." Note that while, of course, the following structures (1) through (5) that are disclosed as the flow measuring device in above mentioned JP '917 are provided in the flow controlling devices 5 and 6, for convenience in understanding the drawings, they are omitted from the drawings: (1) a flow path wherein a fluid flows; (2) a detecting element for detecting the flow of the fluid that is flowing in the flow path; (3) a signal processing circuit for processing a detection signal that is outputted from the detecting element; (4) a converting device for converting, into a digital signal, an analog signal that is outputted from the signal processing circuit; and (5) a calculating device for outputting the flow rate of the fluid that is flowing in the flow path, based on the digital signal outputted from the converting device. Additionally, the functions of these structures (1) through (5) are disclosed in JP '917, below, and are thus omitted in the descriptions.

The solenoid valve 20 is that which adjusts the opening of the flow path for the fluid proportionately, and, preferably, requires a driving electric current with a maximum of about 100 milliamps for a small flow and a driving electric current of a maximum of about 400 milliamps for a large low. The valve driving circuit 21 contains a power transistor or a power MOSFET, or the like, for driving the solenoid valve 20, and may use an approach such as, for example, a voltage-driven approach, an electric current-driven approach, a direct pulse-driven approach, or the like.

The microcomputer 22 sends instruction signals to the valve driving circuit 21 so as to cause the flow that is set by the setting device 1, where, in the present example of embodiment, any single-chip microcomputer, for example, is used, and while not illustrated in FIG. 1, is structured from a CPU, a ROM, and a RAM, or from a EEPROM, or the like. Furthermore, the values for the electric current that must be supplied in order to open the valve, and the gas flows, and the like, that differ depending on the type of gas, and the like, are stored in advance in the RAM or EEPROM, and are calculated by the CPU, and the determination results are outputted as instruction signals in accordance with a procedure that is stored in the ROM.

The analog inputting circuit 23 is structured from an input voltage range limiting circuit and an A/D converter. In the present embodiment, the current setting value that has been set by the setting device 1 is sent to the microcomputer 22 through the provision of an A/D converter in the analog inputting circuit 23 to convert the analog signal, which is a voltage signal, into a digital signal. Note that the A/D converter may be built into the microcomputer 22, in which case the analog inputting circuit 23 is not necessary. For example, an analog inputting circuit as disclosed in JP '917, by the present applicant, is used. The setting signal that is outputted by the setting device 1 may be an analog electric current value (between 4 and 20 milliamps, for example), in which case a high accuracy resistor (of, for example, 250Ω±0.1%) for a current-voltage conversion is connected between the input terminals of the analog inputting circuit 23.

The first power supply circuit 24 is a power supply (+12 V) for an op amp that structures the analog inputting circuit 23, and preferably is a linear regulator with a variable output voltage that uses a three-terminal regulator, or the like. The second power supply circuit 25 is a power supply (+5 V) for, for example, the microcomputer 22 and, in the present embodiment, is A/D converter that is provided at the analog inputting circuit 23, and preferably is a linear regulator that uses a three-terminal regulator, or the like.

The photocoupler 26 is connected between the microcomputer 12 and the valve driving circuit 21, and sends to the valve driving circuit 21 a PWM (Pulse Width Modulation) signal that is outputted from the microcomputer 12. This photocoupler 26 is provided, on the outside thereof, with a current-limiting resistance R for the photocoupler (light-emitting side).

Figure 4:
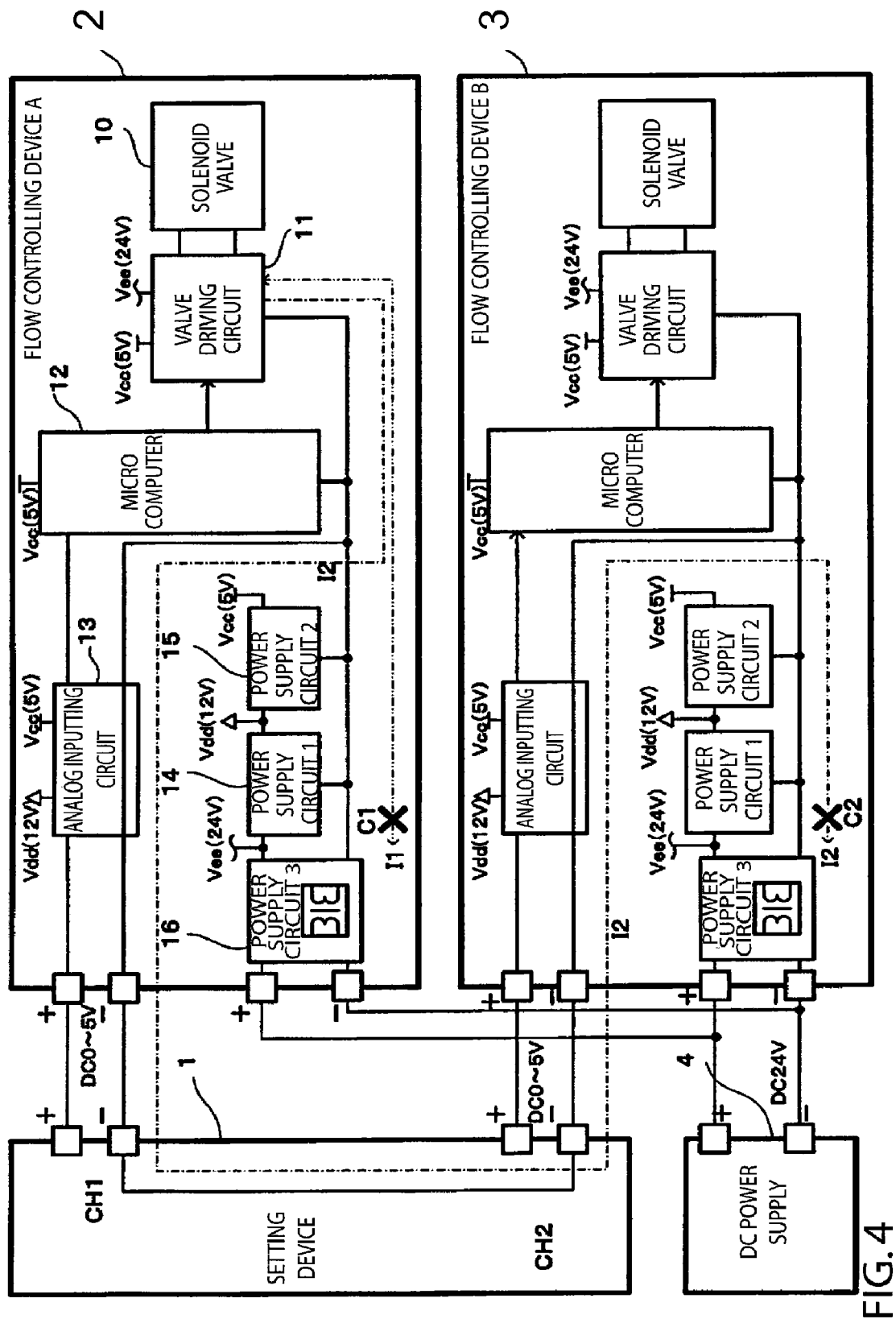
FIG. 4 is a structural diagram illustrating schematically a flow controlling device relating to the flow controlling device according to the present invention.

The third power supply circuit 27 is an isolating switching power supply as the isolating DC-DC converter, and there is no need to stabilize the output voltage insofar as the range thereof is greater than the minimum voltage required by the first power supply circuit 24, which is the next stage, and less than the maximum tolerable voltage. Typically there are large variations in the output voltages of power supplies wherein the output voltages are not stabilized when there are changes in the output current, and thus when the output current is increased, there is the danger that it may become impossible to maintain the minimum voltage level required by the circuitry in the next stage, or, conversely, when the output current is reduced, there is a danger that the voltage will exceed the maximum tolerable supply voltage for the circuitry in the next stage. Because of this, in the case of the third power supply circuit 16 (the DC-DC converter) of FIG. 4, described above, it has been necessary to stabilize the output in order to output a stabilized voltage regardless of changes in the valve driving electric current. However, in the case of the third power supply circuit 27 in FIG. 1 of the present embodiment, the power is not supplied directly to the valve driving circuit 21, and thus there is absolutely no effect when there is a change in the valve driving electric current, and because there is very little change in the electric current consumed by the analog inputting circuit 23 and the microcomputer 22, there will be no large variations in the output voltage of the third power supply circuit 27, even if the output is not stabilized. Because of this, there is no need to be concerned that it might become impossible to maintain the minimum voltage value required by the first power supply circuit 24, and no concern that the voltage will exceed the maximum tolerable supply voltage. That is, in contrast to the case for the third power supply circuit 16 (the DC-DC converter) in FIG. 4, described above, it is possible to simplify the structure of the circuit, and to reduce both cost and size.

Additionally, the third power supply circuit 27 does not supply power directly to the valve driving circuit 21, and thus it need only supply the minimum voltage and electric current output that can be supplied to the analog inputting circuit 23 and the microcomputer 22, along with blocking the electric current for the first power supply circuit 24 and the second power supply circuit 25, making it possible for the third power supply circuit 27 to be used in common by each of the flow controlling devices 5 and 6, regardless of the types of valves, the rates of the flows, and the orifice diameters.

The fourth power supply circuit 28 is a power supply (+5 V) for the valve driving circuit 21, and preferably is a linear regulator that uses a three-terminal regulator, or the like. Here the purpose for using the fourth power supply circuit 28 is to convert the voltage that is supplied from the external power supply 4 to the specific voltage that is required by the valve driving circuit 21, and then to supply this voltage thereto, and, for example, is used in the voltage source for the valve driving circuit 21 to detect the ON/OFF state of the phototransistor on the optical receiver side of the photocoupler 26, the base voltage for driving the aforementioned power transistor, or the gate voltage for driving the power MOSFET.

The flow controlling devices 5 and 6 isolate the external power supply 4 and the valve driving circuits 21 from the analog inputting circuit 23, as illustrated by the dotted line (D-D') illustrated in FIG. 1, through the photocoupler 26 and the third power supply circuit 27. Additionally, they are structured so that the power supply (+24 V) is provided directly to the valve driving circuit 21.

That is, the flows for the flow controlling devices 2 and 3 can each be set by input keys provided on the setting device 1 or through communications from the personal computer. The setting value is sent to the analog inputting circuit as an analog signal with the setting value having a voltage value in the range between zero and 5 V, if discussing the example of the flow controlling device 2. The analog inputting circuit 13 that receives this setting value converts the analog signal into a digital signal through the internal A/D converter, and sends the results to the microcomputer 12. The microcomputer 12 that has received the digital signal performs calculations to make a determination as to the degree to which the valve should be open in order to produce the flow that has been set by the setting device 1, and sends an instruction signal to the photocoupler 26. The photocoupler 26 both isolates the microcomputer 12 and the valve driving circuit 11, and sends, to the valve driving circuit 11, the pulse signal outputted from the microcomputer 12.

After this, the solenoid valve 10 is set, by the valve driving circuit 11, so as to adjust a valve (not shown) that opens and closes the flow path so that the fluid will flow in the volume set by the setting device 1. Then the power supply that drives the valve driving circuit 11 receives the 24 V power supply directly from the external power supply 4 to be the motive source. At this time, as described above, the valve driving circuit 21, the analog inputting circuit 13, and the microcomputer 12 are isolated, by the dotted line D-D', described above, and thus regardless of whether the flow controlling devices 5 and 6 are connected to the setting device 1 singly or in a plurality, there will be no self-interference or mutual interference, making it possible to produce a precise flow, set by the setting device 1.

Note that while in the present embodiment the setting signal outputted from the setting device 1 was a voltage signal of between 0 and 5 V, it may instead be a voltage signal between 1 and 5 V, or may be an electric current signal between 4 and 20 milliamps, as described above.

The invention claimed is:

1. A flow controlling device comprising a flow path wherein a fluid flows, a solenoid valve for adjusting the degree of opening of the flow path, a valve driving circuit for driving the solenoid valve, a flow rate measuring device measuring a flow rate of the fluid that flows in the flow path, and a controlling device applying instruction signals to the valve driving circuit so as to cause the flow rate to match a setting value, and which operates having received a power supply supplied from the outside, comprising:
   an analog inputting circuit converting one of an inputted analog voltage value or analog electric current value, as a setting value, into one of a specific digital value or analog value,
   a controlling device outputting a command signal based on the measured flow rate and the one of the digital signal or analog signal transmitted from the analog inputting circuit;
   a signal transmitting device isolating electrically the controlling device and the valve driving circuit and transmitting the instruction signal from the controlling device to the valve driving circuit;
   an isolating power supply circuit isolating electrically the analog inputting circuit and the controlling device from the valve driving circuit, and supplying power to the analog inputting circuit and the controlling device; and
   a non-isolating power supply circuit supplying power to the valve driving circuit.

2. A flow controlling device as set forth in claim 1, wherein:
   the isolating power supply circuit has at least one linear regulator, and is structured from an isolating DC-DC converter with an unstable output supplying, to the linear regulator, an electric voltage that is at least the minimum required voltage and at most the maximum tolerable voltage, wherein:
   each linear regulator outputs its own predetermined constant voltage.

3. A flow controlling device comprising a setting device setting and outputting a flow rate, an external power supply supplying a specific direct current voltage, a flow path wherein a fluid flows, a solenoid valve adjusting the opening of the flow path, a valve driving circuit driving the solenoid valve, a flow rate measuring device measuring a flow rate of the fluid that flows in the flow path, and a controlling device applying instruction signals to the valve driving circuit so as to cause the flow rate to match a setting value, comprising:
   an analog inputting circuit converting one of an analog voltage value or an analog electric current value, inputted as the setting value from the setting device, into one of a specific digital value or analog value, and transmitting;
   a controlling device outputting a command signal based on the measured flow rate and the one of the digital signal or analog signal transmitted from the analog inputting circuit;
   a signal transmitting device isolating electrically the controlling device and the valve driving circuit and transmitting the instruction signal from the controlling device to the valve driving circuit;
   an isolating power supply circuit isolating electrically, the analog inputting circuit, and the controlling device, from the external power supply, and converting into a specific voltage a voltage supplied from the external power supply, and supplying electric power to the analog inputting circuit and the controlling device; and
   a non-insulating power supply circuit, connected directly to the external power supply, converting to a specific voltage the voltage supplied from the external power supply and supplying power to the valve driving circuit.

4. A flow controlling device as set forth in claim 3, comprising:
   a third power supply circuit supplying the minimum required voltage to a first power supply circuit supplying an electric power to the analog inputting circuit, and to a second power supply circuit supplying an electric power to the controlling device, and also blocking the electric current that is generated by the first power supply circuit and the second power supply circuit; and
   a fourth power supply circuit, connected directly to an external power supply, supplying a stabilized voltage to the valve driving circuit.

5. A flow controlling device as set forth in claim 3, wherein the setting device has a plurality of output channels, at least two flow controlling devices are connected to the plurality of output channels, and the flow controlling devices are isolated from each other by a signal transmitting device and an isolating power supply circuit.

* * * * *